United States Patent
Preussner

(10) Patent No.: US 10,042,041 B2
(45) Date of Patent: Aug. 7, 2018

(54) APPARATUS AND METHOD FOR DETECTING AND CORRECTING FOR BLOCKAGE OF AN AUTOMOTIVE RADAR SENSOR

(71) Applicant: Veoneer US, Inc., Southfield, MI (US)

(72) Inventor: Jonathan Preussner, Wayland, MA (US)

(73) Assignee: Veoneer US, Inc., Southfield, MI (US)

( * ) Notice: Subject to any disclaimer, the term of this patent is extended or adjusted under 35 U.S.C. 154(b) by 429 days.

(21) Appl. No.: 14/697,865

(22) Filed: Apr. 28, 2015

(65) Prior Publication Data

US 2016/0320471 A1 Nov. 3, 2016

(51) Int. Cl.
  *G01S 7/40* (2006.01)
  *G01S 13/524* (2006.01)
  (Continued)

(52) U.S. Cl.
  CPC .......... *G01S 7/4004* (2013.01); *G01S 13/524* (2013.01); *G01S 13/536* (2013.01); *G01S 13/582* (2013.01);
  (Continued)

(58) Field of Classification Search
  CPC ........ G01S 7/40; G01S 7/4004; G01S 13/524; G01S 13/536; G01S 13/582; G01S 13/284; G01S 13/60; G01S 13/931
  (Continued)

(56) References Cited

U.S. PATENT DOCUMENTS 6,469,659 B1 10/2002 Lajiness et al.
6,611,227 B1 * 8/2003 Nebiyeloul-Kifle .. G01S 7/4004
  342/173
(Continued)

FOREIGN PATENT DOCUMENTS

DE 19647660 5/1998
DE 19929794 1/2000
(Continued)

OTHER PUBLICATIONS

Search Report and Written Opinion dated Jun. 21, 2016 in corresponding PCT Application No. PCT/US2016/021356, filed Mar. 8, 2016.

*Primary Examiner* — Frank J McGue
(74) *Attorney, Agent, or Firm* — Burns & Levinson, LLP; Steven M. Mills

(57) ABSTRACT

A radar system and method in a host system include a radar detector detecting reflected radar signals and converting the reflected radar signals into digital data signals. A motion detector detects motion of the host system and indicates velocity of the host system. A processor receives the digital data signals and processes the digital data signals to categorize the digital data signals into target categories, one of the target categories being an environmental clutter category, the processor associating each of a plurality of processed groups of the digital data signals with a velocity, one of the groups of digital data being associated with a first preselected velocity. When the velocity of the host system changes, if the velocity associated with the one of the groups of digital data of the environmental clutter category has not changed, then the processor indicates that the radar detector is at least partially blocked.

22 Claims, 7 Drawing Sheets

(51) Int. Cl.
*G01S 13/536* (2006.01)
*G01S 13/58* (2006.01)
*G01S 13/93* (2006.01)
*G01S 13/60* (2006.01)

(52) U.S. Cl.
CPC ............ *G01S 13/584* (2013.01); *G01S 13/60* (2013.01); *G01S 13/931* (2013.01); *G01S 2007/4039* (2013.01); *G01S 2013/9332* (2013.01); *G01S 2013/9353* (2013.01); *G01S 2013/9378* (2013.01); *G01S 2013/9385* (2013.01)

(58) Field of Classification Search
USPC .......................................................... 342/70
See application file for complete search history.

(56) References Cited

U.S. PATENT DOCUMENTS

| | | |
|---|---|---|
| 7,973,701 B2 | 7/2011 | Lohmeier et al. |
| 8,441,394 B2 | 5/2013 | Alland |

FOREIGN PATENT DOCUMENTS

| | | |
|---|---|---|
| DE | 102009001265 | 9/2010 |
| DE | 102009032124 | 1/2011 |

* cited by examiner

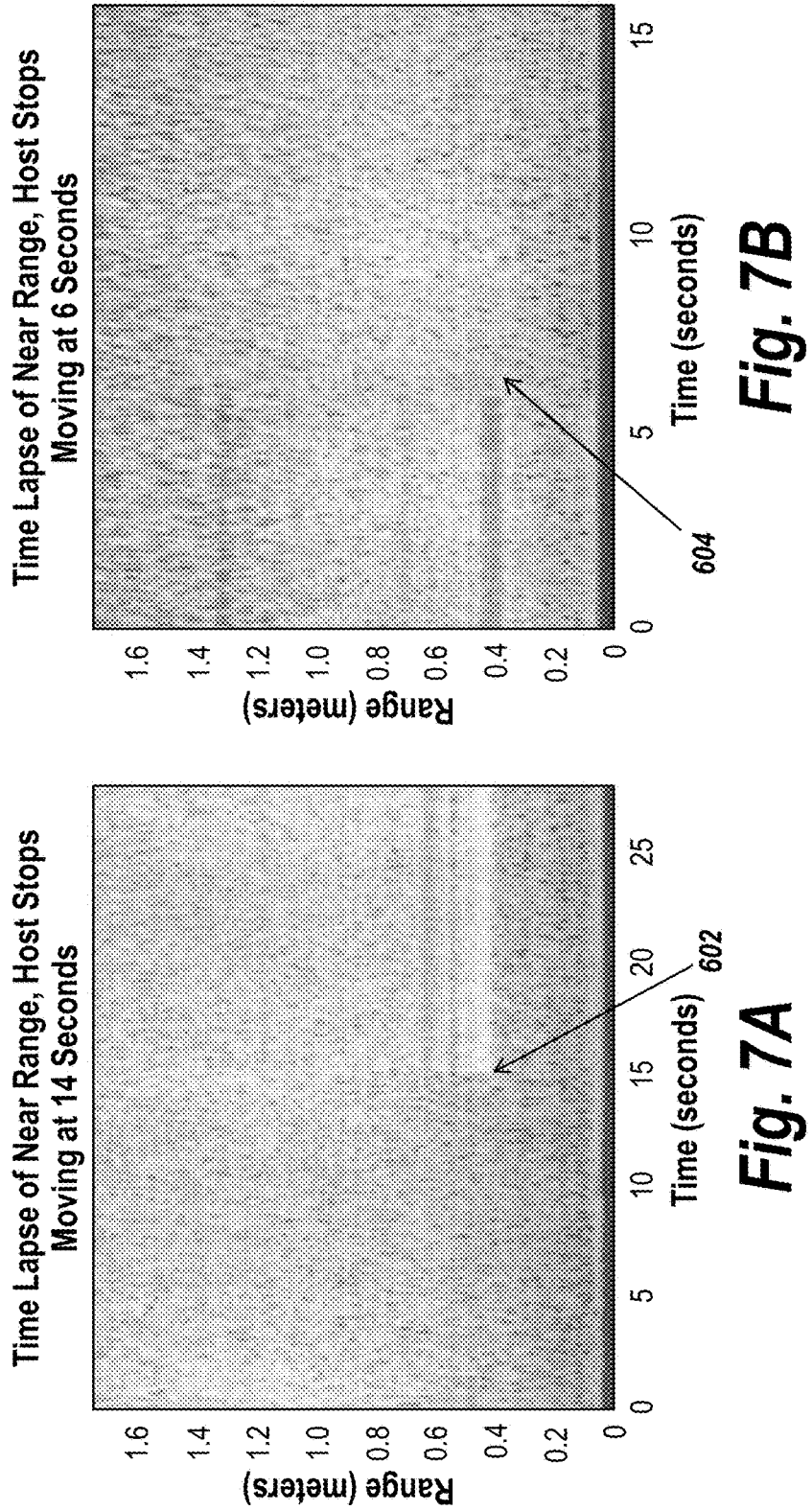

APPARATUS AND METHOD FOR DETECTING AND CORRECTING FOR BLOCKAGE OF AN AUTOMOTIVE RADAR SENSOR

BACKGROUND

1. Technical Field

The present disclosure is related to automotive radar systems and, in particular, to an apparatus and method for detecting and correcting for blockage of an automotive radar sensor.

2. Discussion of Related Art

In automotive radar systems, it is desirable to know when the radar sensor is blocked by debris, such as dirt, snow, ice, etc. Sensor blockage attenuates the transmitted and received signal such that objects in the field of view are no longer detectable. It is also important to alert the driver when the sensor is blocked so that the driver does not rely on the radar system while a sensor is blocked, and so that the driver can intervene and clear the debris from the sensor to restore performance of the system.

Declaring a sensor blockage based on the absence of radar signal processing detections is a relatively straightforward means of determining sensor blockage with minimal additional processing time or resources. One drawback of this approach is that it is difficult to distinguish the blocked case from the case in which there are relatively few or no objects large enough to create detections in the field of view of a sensor that is not blocked and is functioning properly. This situation can occur, for example, when the automobile in which the system is operating is passing through a desert.

SUMMARY

According to one aspect, a radar system in a movable host system is provided. The radar system includes a radar detector for detecting reflected radar signals and converting the reflected radar signals into digital data signals. A motion detector detects motion of the host system and generates a signal indicative of velocity of the host system. A processor receives the digital data signals and processes the digital data signals to categorize the digital data signals into one or more target categories, one of the target categories being an environmental clutter category, the processor associating each of a plurality of processed groups of the digital data signals with a velocity, one of the groups of digital data being associated with a first preselected velocity. When the signal indicative of velocity of the host system indicates that the velocity of the host system has changed, if the velocity associated with the one of the groups of digital data of the environmental clutter category has not changed from the first preselected velocity, then the processor generates a signal which indicates that the radar detector is at least partially blocked.

In some exemplary embodiments, the processor performs a Fast Fourier Transform (FFT) on the digital data signals. The processed groups of digital data can be associated with data range bins generated by the FFT. Each data range bin generated by the FFT can be associated with a Doppler velocity. The first preselected velocity can be associated with a zero-Doppler-velocity range bin generated by the FFT.

In some exemplary embodiments, the first preselected velocity associated with the one of the groups of digital data has a zero value.

In some exemplary embodiments, the signal indicative of velocity of the host system identifies a present motion state of the host system, a first motion state being a host-stationary motion state and a second motion state being a host-moving motion state. In some exemplary embodiments, when the signal indicative of velocity of the host system indicates that the velocity of the host system has changed, it indicates that the host system has transitioned between the first motion state and the second motion state.

In some exemplary embodiments, the reflected radar signals comprise a radar signal transmitted by the radar system and reflected from a scene.

In some exemplary embodiments, the radar system is an automotive radar system, the movable host system being an automobile. The environmental clutter category can include radar collective return from a surface of a road on which the automobile is located, the radar collective return being distributed within the beam of the radar detector. The reflected radar signals can comprise a radar signal transmitted by the radar system and reflected from a scene. The scene can include a surface of a road on which the automobile is located.

According to another aspect, a method of processing in a movable radar system is provided. The method includes: detecting reflected radar signals with a radar detector and converting the reflected radar signals into digital data signals; detecting motion of the radar system and generating a signal indicative of velocity of the radar system; processing the digital data signals to categorize the digital data signals into one or more target categories, one of the target categories being an environmental clutter category, the processing including associating each of a plurality of processed groups of the digital data signals with a velocity, one of the groups of digital data being associated with a first preselected velocity; and generating a signal which indicates that the radar detector is at least partially blocked when, if the signal indicative of velocity of the radar system indicates that the velocity of the radar system has changed, the velocity associated with the one of the groups of digital data of the environmental clutter category has not changed from the first preselected velocity.

In some exemplary embodiments, the processing comprises performing a Fast Fourier Transform (FFT) on the digital data signals. The processed groups of digital data can be associated with data range bins generated by the FFT. Each data range bin generated by the FFT can be associated with a Doppler velocity. The first preselected velocity can be associated with a zero-Doppler-velocity range bin generated by the FFT.

In some exemplary embodiments, the first preselected velocity associated with the one of the groups of digital data has a zero value.

In some exemplary embodiments, the signal indicative of velocity of the radar system identifies a present motion state of the radar system, a first motion state being a system-stationary motion state and a second motion state being a system-moving motion state. In some exemplary embodiments, when the signal indicative of velocity of the radar system indicates that the velocity of the radar system has changed, it indicates that the radar system has transitioned between the first motion state and the second motion state.

In some exemplary embodiments, the reflected radar signals comprise a radar signal transmitted by the radar system and reflected from a scene.

In some exemplary embodiments, the radar system is an automotive radar system, the movable radar system being disposed in an automobile. The environmental clutter category can include radar collective return from a surface of a road on which the automobile is located, the radar collective return being distributed within the beam of the radar detector. The reflected radar signals can comprise a radar signal transmitted by the radar system and reflected from a scene. The scene can include a surface of a road on which the automobile is located.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIGS. 7A and 7B include graphs of detections generated from radar returns to a radar sensor module in a host automobile, over time, illustrating the detections over Doppler range bins from zero meters to approximately 1.7 meters, in accordance with some exemplary embodiments.

DETAILED DESCRIPTION

According to the exemplary embodiments of the present disclosure, it is determined whether an automotive radar sensor is in a blocked state or in a "desert" state, i.e., the state is which the sensor is unblocked and is functioning properly, but few or no detections of objects are made. According to the exemplary embodiments, this is accomplished by leveraging the properties of distributed clutter, such as, for example, the road surface, and a change in motion state of the host vehicle.

According to the disclosure, the approach is referred to herein as the Blockage Environmental Clutter Confirmation Approach (BECCA). In some exemplary embodiments, to confirm the blocked-sensor case, BECCA records a history of the zero-Doppler component of the incoming signals at short ranges where a small amount of energy is returned from the road surface. In a pulse-Doppler radar system, when the host vehicle is moving, this ground clutter energy is spread across the Doppler spectrum due to the sensor's wide field of view, making it undetectable among the noise. However, when the host vehicle is stationary, the distributed ground clutter is primarily in the zero-Doppler bin, such that the change is detectable. According to the disclosure, by comparing the history of zero-Doppler moving and stationary range profile data, the BECCA determines if the sensor is blocked. This approach uses knowledge of the host vehicle's velocity and can be performed upon vehicle start-up as soon as the car is moved from a parked position. According to the present disclosure, the motion of the host vehicle can be in either the forward or the reverse direction.

According to the exemplary embodiments, when the host vehicle is stationary, the azimuthally-distributed ground clutter, e.g., road surface, is combined in the zero-Doppler range bin, and when the host vehicle moves, the clutter energy is spread over the waveform's Doppler space. When the sensor is blocked, the zero-Doppler (ground clutter) signal doesn't exhibit a change in magnitude. This means that, according to the present disclosure, the blockage decision is based on range-Doppler information directly and does not rely on post-processed detections. It also means that the blockage can be determined shortly after the host vehicle is moved from start-up, such as pulling out of a parking spot, for example.

Figure 1:
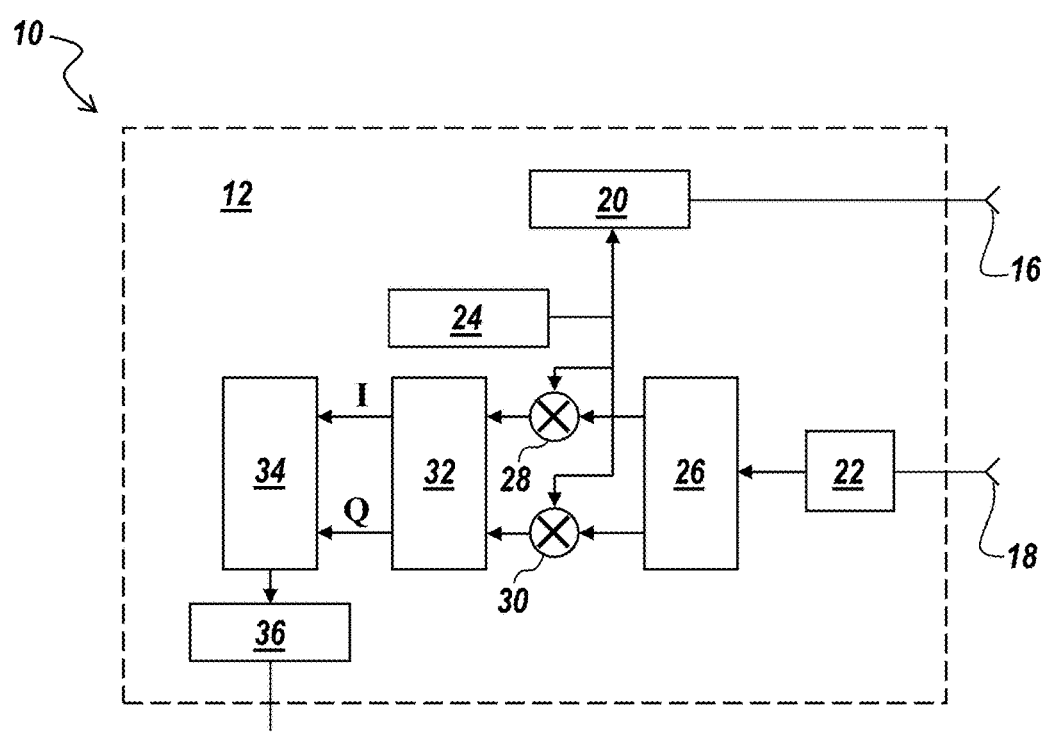
FIG. 1 includes a schematic block diagram of an automotive radar sensor module for processing automotive radar signals, in accordance with some exemplary embodiments.

FIG. 1 includes a schematic block diagram of an automotive radar sensor module 10 for processing automobile radar signals, in accordance with some exemplary embodiments. Referring to FIG. 1, system 10 includes a radar module 12, which processes radar transmit and receive signals which are compatible with the radar detection and monitoring system in the host automobile. Radar module 12 generates and transmits radar signals into the region adjacent to the host vehicle that is being monitored by the radar system. Generation and transmission of signals is accomplished by RF signal generator 24, radar transmit circuitry 20 and transmit antenna 16. Radar transmit circuitry 20 generally includes any circuitry required to generate the signals transmitted via transmit antenna 16, such as pulse shaping circuitry, transmit trigger circuitry, RF switch circuitry, or any other appropriate transmit circuitry used by the radar system.

Radar module 12 also receives returning radar signals at radar receive circuitry 22 via receive antenna 18. Radar receive circuitry 22 generally includes any circuitry required to process the signals received via receive antenna 18, such as pulse shaping circuitry, receive trigger circuitry, RF switch circuitry, or any other appropriate receive circuitry used by the radar system. The received signals processed by radar receive circuitry 22 are forwarded to phase shifter circuitry 26, which generates two signals having a predetermined phase difference. These two signals, referred to as an inphase (I) signal and a quadrature (Q) signal, are mixed with an RF signal from RF signal generator 24 by mixers 28 and 30, respectively. The resulting difference signals are further filtered as required by filtering circuitry 32 to generate baseband I and Q signals, labeled "I" and "Q" in FIG. 1. The baseband I and Q signals are digitized by analog-to-digital converter circuitry (ADC) 34.

In automobile radar systems, these digitized I and Q baseband signals are processed by a processor, such as a digital signal processor (DSP) 36. In some exemplary embodiments, the DSP 36 can perform processing such as a Fast Fourier Transform (FFT) to generate a plurality of Doppler range bins processed according to the detailed description herein to identify when the sensor is blocked.

Figure 2:
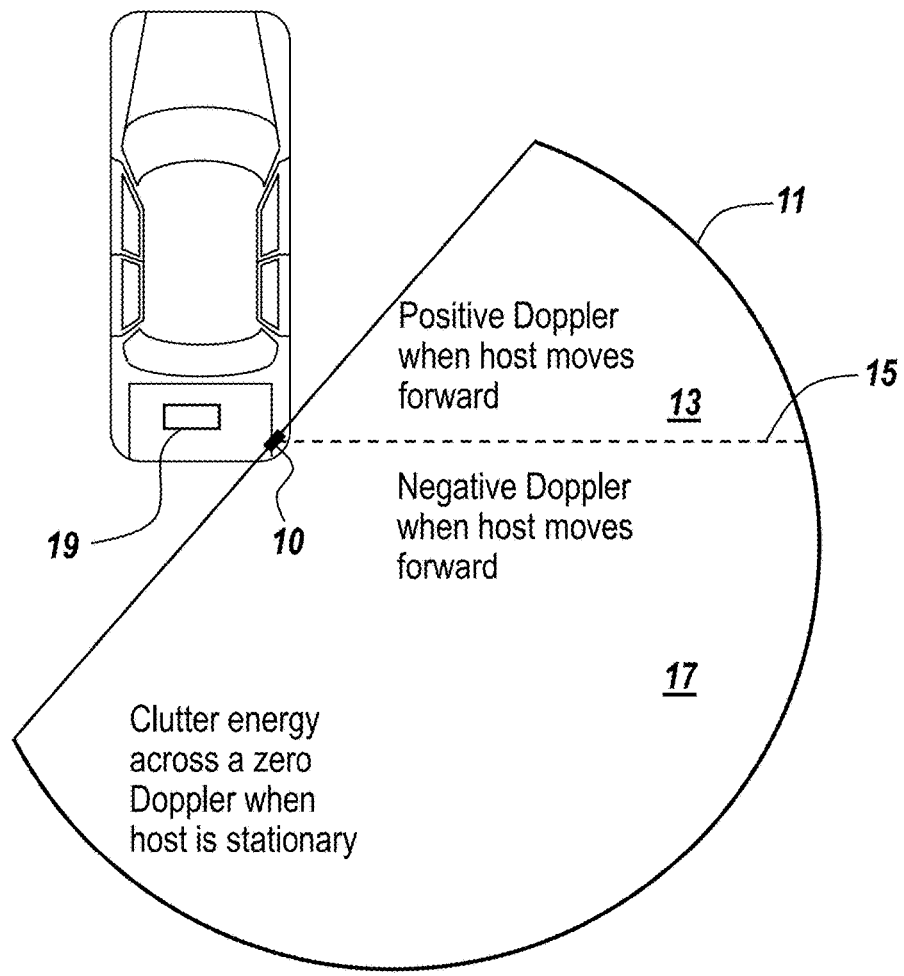
FIG. 2 includes a schematic diagram of a host automobile having an automotive radar sensor module mounted therein.

FIG. 2 includes a schematic diagram of a host automobile 5 having an automotive radar sensor module 10 mounted therein. FIG. 1 schematically illustrates distributed environmental ground clutter radar return energy within a region 11 around the field of view of radar sensor module 10. In exemplary embodiments illustrated and described herein in detail, the distributed environmental ground clutter radar return is from a surface of a road on which host automobile 5 is located. Host automobile 5 may have a stationary state in which it does not move with respect to the road surface and a moving state in which it is moving along the road surface. Host automobile 5 may also include a velocity sensor, generally identified by reference numeral 19, which detects the velocity of host automobile 5 with respect to the road surface and generates a signal indicative of that velocity and provides that signal to processing circuitry within radar module 10, which uses the signal as described in detail herein.

As illustrated in FIG. 2, region 11 within the field of view of radar sensor module 10 can be regarded as including two subregions 13 and 17 on opposite sides of a line 15, which is perpendicular to the longitudinal axis and the axis of motion of host automobile 5. In subregion 13, which is forward of line 15, when host automobile 5 moves in the forward direction, positive Doppler motion returns for the distributed ground clutter are generated by radar sensor module 10. In contrast, in subregion 17, which is rearward of line 15, when host automobile 5 moves in the forward direction, negative Doppler motion returns for the distributed ground clutter are generated by radar sensor module 10. When host automobile 5 is stationary, the ground clutter energy is combined at zero-Doppler, since host automobile 5 is not moving relative to the road surface. It will be understood that when host automobile 5 moves in a reverse direction, the signs of the Doppler returns for subregions 13 and 17 are the opposite of those described above.

Hence, in general, in a low-clutter scenario, also referred to herein as a "desert" scenario, it is difficult to determine a clear state using returns from clutter moving past radar sensor module 10. This is because, in the desert scenario, detections of clutter are rare, if not nonexistent. No large targets are present in the desert scenario. That is, there are no detections or changes in the range-Doppler map's mean energy over time. Therefore, in the desert scenario, the clear, unblocked case is not readily discernable from the blocked case.

According to the present disclosure, distributed ground, i.e., road surface, clutter is used to determine whether radar sensor module 10 is clear or blocked. Ground-stationary clutter is distributed over the Doppler velocity range. For example, the ground clutter can be considered to be distributed over a Doppler velocity range extending from a negative value of −0.4 of the velocity of host automobile 5 up to a positive value equal to the velocity of host automobile 5.

While host automobile 5 is not moving, the distributed ground clutter is detectable because it all combines in the zero-Doppler range bin. According to the exemplary embodiments, energy in the zero-Doppler bin is examined when host automobile 5 changes its motion state, i.e., either stops moving or begins moving from a stationary state. If the energy in the zero-Doppler bin changes when the motion state of host automobile 5 changes, then it is concluded that radar sensor module 5 is clear, i.e., not blocked. This is because, when host automobile 5 is moving, ground clutter energy is distributed over non-zero-Doppler bins; and, when host automobile 5 comes to a stop, ground clutter energy moves to being combined exclusively in the zero-Doppler bin. That is, the ground clutter energy in the zero-Doppler bin increases. In contrast, when host automobile 5 begins moving from a stationary state, the ground clutter energy that was formerly gathered in the zero-Doppler bin becomes distributed over non-zero-Doppler bins. That is, the ground clutter energy in the zero-Doppler bin decreases.

According to the present disclosure, if either of these changes is detected, it can be concluded that radar sensor module 10 is functioning properly and is not blocked. Conversely, if the motion state of host automobile 5 changes from stationary to moving, or vice versa, and no change in ground clutter energy in the zero-Doppler bin is detected, then it can be concluded that radar sensor module 10 is not functioning properly and may be blocked.

In some exemplary embodiments, existing detections may become low. The reason for the low level of detections may be that host automobile 5 has entered the desert scenario, or that radar sensor module 10 has become blocked. When this occurs, in some embodiments, radar sensor module 10 continues monitoring detections until the motion state of host automobile changes, i.e., host automobile 5 either starts moving from a stop or it stops moving. When this change in motion state of host automobile 5 occurs, the BECCA can be implemented as described herein in detail.

Figure 3:
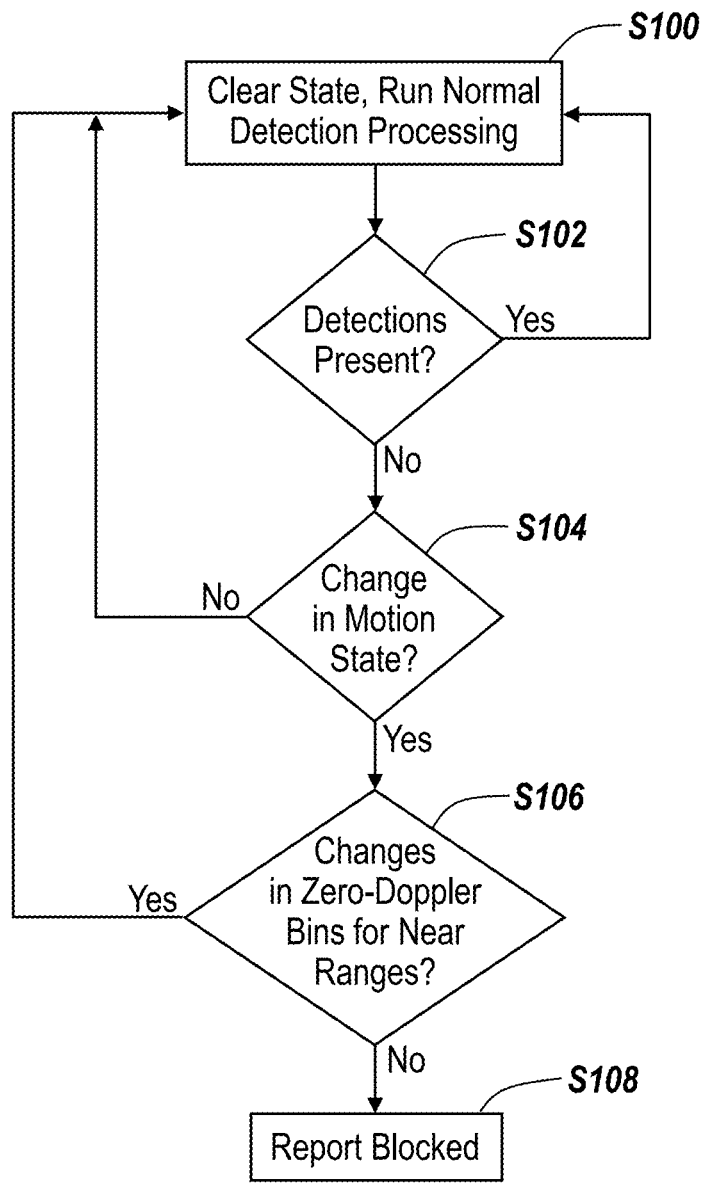
FIG. 3 includes a schematic logical flow diagram illustrating logical flow of detection of a blocked radar sensor module, in accordance with some exemplary embodiments.

FIG. 3 includes a schematic logical flow diagram illustrating logical flow of detection of a blocked radar sensor module, according to some embodiments. Referring to FIG. 3, in step S100, radar sensor module 10 is in a clear unblocked state and is running normal radar detection processing. In decision step S102, the presence of detections is checked. If detections are present and/or have not dropped below some predetermined threshold, then normal detection processing in the clear state in step S100 continues via the "Yes" output from decision step S102. However, if detections are not present or have dropped below some predetermined threshold, then processing continues along the "No" output from decision step S102 to decision step S104, where it is determined whether the motion state of host automobile 5 has changed. That is, it is determined whether host automobile 5 has come to a stop from a moving state or has started moving from a stationary state. If not, then the process loops back along the "No" output of decision step S104 and continues to monitor the level of detections and wait for a change in the motion state of host automobile 5. If detections continue to be below the threshold or nonexistent, and if the motion state of host automobile 5 changes, then flow continues out of the "Yes" output of decision step S104 to decision step S106. In decision step S106, it is determined whether changes in the zero-Doppler bins for near ranges have occurred. If so, then it is determined that radar sensor module 10 is not blocked, and flow loops back to normal detection processing in step S100 via the "Yes" branch of decision step S106. If no change in the zero-Doppler bins for near ranges have occurred, then flow continues via the "No" output of decision step S106 to step S108, where it is determined that radar sensor module 10 is blocked and the blockage is reported.

Thus, according to exemplary embodiments, in a target-rich environment, radar sensor module 10 continues in a clear state and processes detections normally. If the summed detection energy drops below a predetermined threshold, i.e., detections drop below a threshold, a confirmation approach, in some embodiments, the BECCA approach described in detail herein, is performed. In some exemplary embodiments, BECCA is performed until: (i) detections return to a level above the threshold such that radar sensor module 10 is marked as clear, (ii) the motion state of host automobile 5 changes, BECCA is performed again, and radar sensor module 10 is marked again as clear or blocked, or (iii) host automobile 5 is moving in the desert detection scenario for over a predetermined time period, and radar sensor module 5 is marked as pre-blocked. In some particular exemplary embodiments, the predetermined time period can be approximately one minute. Other predetermined time periods can be used depending on the scenario and desired results. In some exemplary embodiments, once radar sensor module 10 is marked blocked, BECCA continues to check whether the blockage has been removed.

Figure 4:
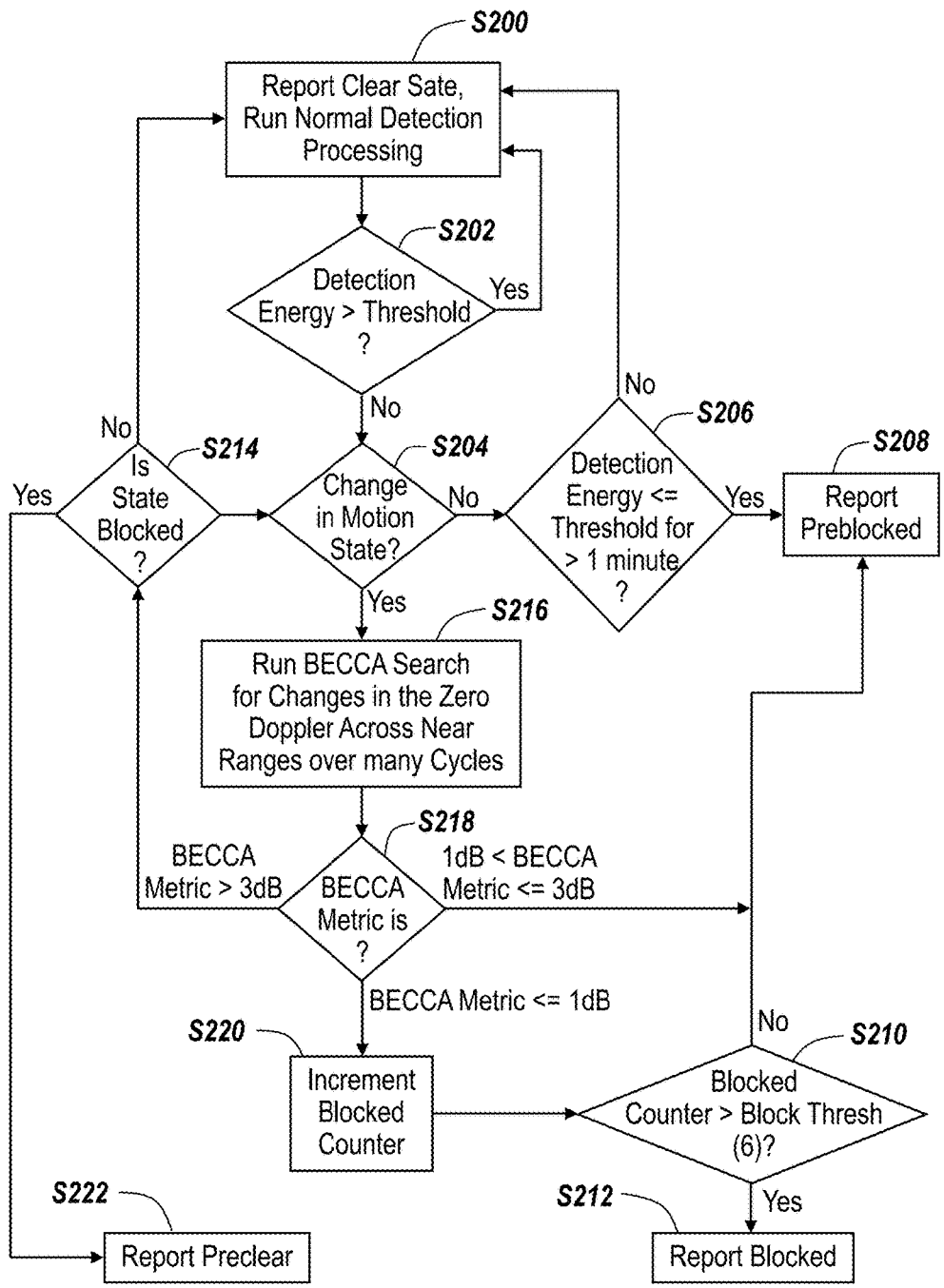
FIG. 4 includes a detailed schematic logical flow diagram of flow of detection of a blocked radar sensor module, in accordance with some exemplary embodiments.

FIG. 4 includes a detailed schematic logical flow diagram of flow of a blockage detection approach in a radar sensor module, according to some exemplary embodiments. Referring to FIG. 4, in step S200, radar sensor module 10 is in a clear unblocked state and is running normal radar detection processing. In decision step S202, the presence of detections is checked. If detections are present and detection energy has not dropped below some predetermined threshold, then normal detection processing in the clear state in step S200 continues via the "Yes" output from decision step S202. However, if detection energy has dropped below the predetermined threshold, then processing continues along the "No" output from decision step S202 to decision step S204, where it is determined whether the motion state of host automobile 5 has changed. That is, it is determined whether host automobile 5 has come to a stop from a moving state or has started moving from a stationary state. If no motion state change has occurred, then a timer is started to check whether detection energy remains below the threshold for a predetermined period of time. In the illustrated exemplary embodiment, the predetermined period of time is one minute. It will be understood that one of many possible predetermined periods of time can be used. The timer is checked in decision step S206. If the predetermined period of time has not expired, then the process loops back along the "No" output of decision block S206 to step S200. If the detection energy remains at or below the threshold and no change in motion state of host automobile 5 is detected for a period greater than the predetermined period, then flow proceeds along the "Yes" output of decision step S206 to step S208, where radar sensor module 10 is reported as being in a "preblocked" state.

Thus, in the preblocked state, detection energy has dropped below a threshold, but the motion state of host automobile 5 has not changed. Therefore, it is not yet concluded that radar sensor module 10 is blocked. If, during the preblocked state, detection energy returns to a level above the threshold in decision step S202, then normal detection processing resumes in step S200. However, if, during the preblocked state, a change in motion state of host automobile 5 is detected, then flow proceeds along the "Yes" output of decision step S204 to step S216. In step S216, the BECCA is run to detect changes in the zero-Doppler across near ranges over a plurality of cycles. In particular, according to exemplary embodiments, a parameter referred to herein as the "BECCA Metric" is computed according to the following equation:

$$BeccaMetric = 20 * \log_{10}\left(\frac{\sum_{rngbin=20}^{39} RDmagnitude_{stopped}(rngbin, 0)}{\sum_{rngbin=20}^{39} RDmagnitude_{moving}(rngbin, 0)}\right)$$

where BeccaMetric is a measure, in decibels, of the change in the Range Doppler Map from the moving (RDmagnitude$_{moving}$) and stopped (RDmagnitude$_{stopped}$) motion states. In the particular illustrated exemplary embodiments, the RDmap cells from zero Doppler, range bins 20-39 are summed and divided in this equation. The log base 10 of the quotient is multiplied by 20 to result in the log-power ratio in decibels. The BeccaMetric is then used in step S218 to determine blockage.

In decision step S218, a decision as to the flow of the process is made based on the above computation of the BECCA Metric. Specifically, in some exemplary embodiments, if the BECCA Metric is greater than 1 dB but less than or equal to 3 dB, then the system remains in the preblocked state. If the BECCA Metric is less than or equal to 1 dB, then radar sensor module 10 is considered blocked. However, according to some exemplary embodiments, to eliminate uncertainty, it may be required that a plurality of computations of the BECCA Metric result in values less than or equal to 1 dB, i.e., a plurality of blocked determinations may be required. In the exemplary illustrated embodiment, six blocked determinations must be made in order for the system to report that radar sensor module 10 is blocked. It will be understood that other numbers of required blocked determinations may be required, including only a single blocked determination. When the BECCA Metric is less than or equal to 1 dB, flow proceeds to step S220, where a blocked counter, which counts the number of times the BECCA Metric indicates a blockage, is incremented. In decision step S210, it is determined whether the predetermined required number of blocked determinations, in this embodiment, six, has been reached. If so, then flow proceeds out of the "Yes" output of decision step S210 to step S212, where radar sensor module 10 is reported as blocked. If the required number of blocked determinations is not exceeded, then flow proceeds out of the "No" output of decision step S210, such that the state remains preblocked and a new BECCA Metric is computed and checked in steps S216 and S218. In some exemplary embodiments, this recomputing and rechecking of the BECCA Metric in steps S216 and S218 are performed only if it is again determined in step S202 that detection energy is still not above the threshold and it is also determined in step S204 that another change in motion state has occurred. Thus, in these exemplary embodiments, a blocked sensor can be reported in step S212 after a plurality of, e.g., six, motion state changes (step S204) while detector energy is low (step S212). It will also be understood that the limits used for the BECCA Metric in decision step S218, i.e., 1 dB, 3 dB, are illustrative examples only. Other limits can be used.

As described above, while in the blocked state, the system continues to compute and check the BECCA Metric in steps S216 and S218. If the BECCA Metric is greater than 3 dB, flow proceeds to decision step S214, where it is determined whether the system is currently in the blocked state, as set in step S212. If not, then flow continues out of the "No" output back to step S200, where normal detection processing continues. If, in decision step S214, it is determined that the system is in the blocked state, then, because of the increased value of the BECCA Metric, it is concluded that the system has entered a "preclear" state, and the preclear state is reported based on a conclusion that the blockage has been cleared. In the preclear state, normal detection processing is performed in step S200, and the detection energy is checked in decision step S202 to determine whether detections have returned. If the detection energy has returned to a level above the threshold, then the system reports that radar sensor module 10 is in the clear state, and normal detection processing continues.

Figure 5:
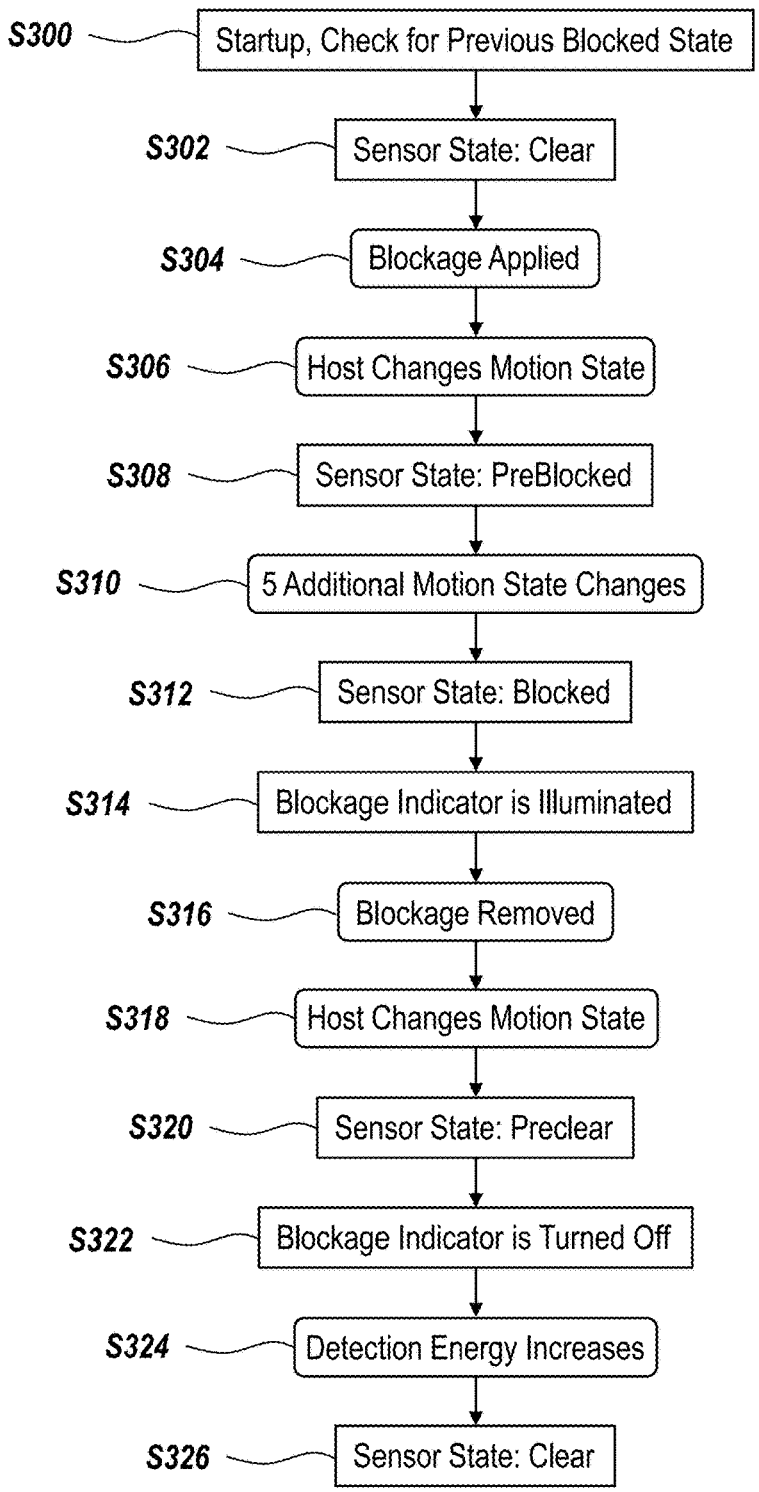
FIG. 5 includes a schematic state change diagram illustrating a blockage event of an automotive radar sensor module, in accordance with some exemplary embodiments.

FIG. 5 includes a schematic state change diagram illustrating a blockage event of an automotive radar sensor module, according to some exemplary embodiments. Referring to FIG. 5, in step S300, upon start-up, a check is made for blockage remaining from the previous shutdown. In step S302, the sensor state is marked as clear. In step S304, at some point in the drive, blockage is applied and low detection energy is observed by the sensor. Then, in step S306, host automobile 5 changes its motion state. As described above in detail, the BECCA evaluates the range Doppler data for presence of blockage upon the change in motion state. After the first evaluation that yields a BECCA Metric that indicates a blocked sensor, the sensor state changes to preblocked in step S308. In some exemplary embodiments, as described above in detail, after five additional motion state changes indicated by step S310, the sensor state changes to blocked in step S312 if six BECCA Metric evaluations indicate that the sensor is blocked. In this case, in some exemplary embodiments, a blockage indicator, such as a warning light or message, is activated, i.e., illuminated, in step S314. At some point, the blockage may be removed from the sensor, as indicated in step S316. Then, after another motion state change in step S318, the sensor state changes to preclear in step S320. In some exemplary embodiments, as shown in step S322, the blockage indicator can be turned off. Since the blockage is removed, when detection energy increases in step S324, the sensor state changes back to clear in step S326, and normal detection processing resumes.

Figure 6:
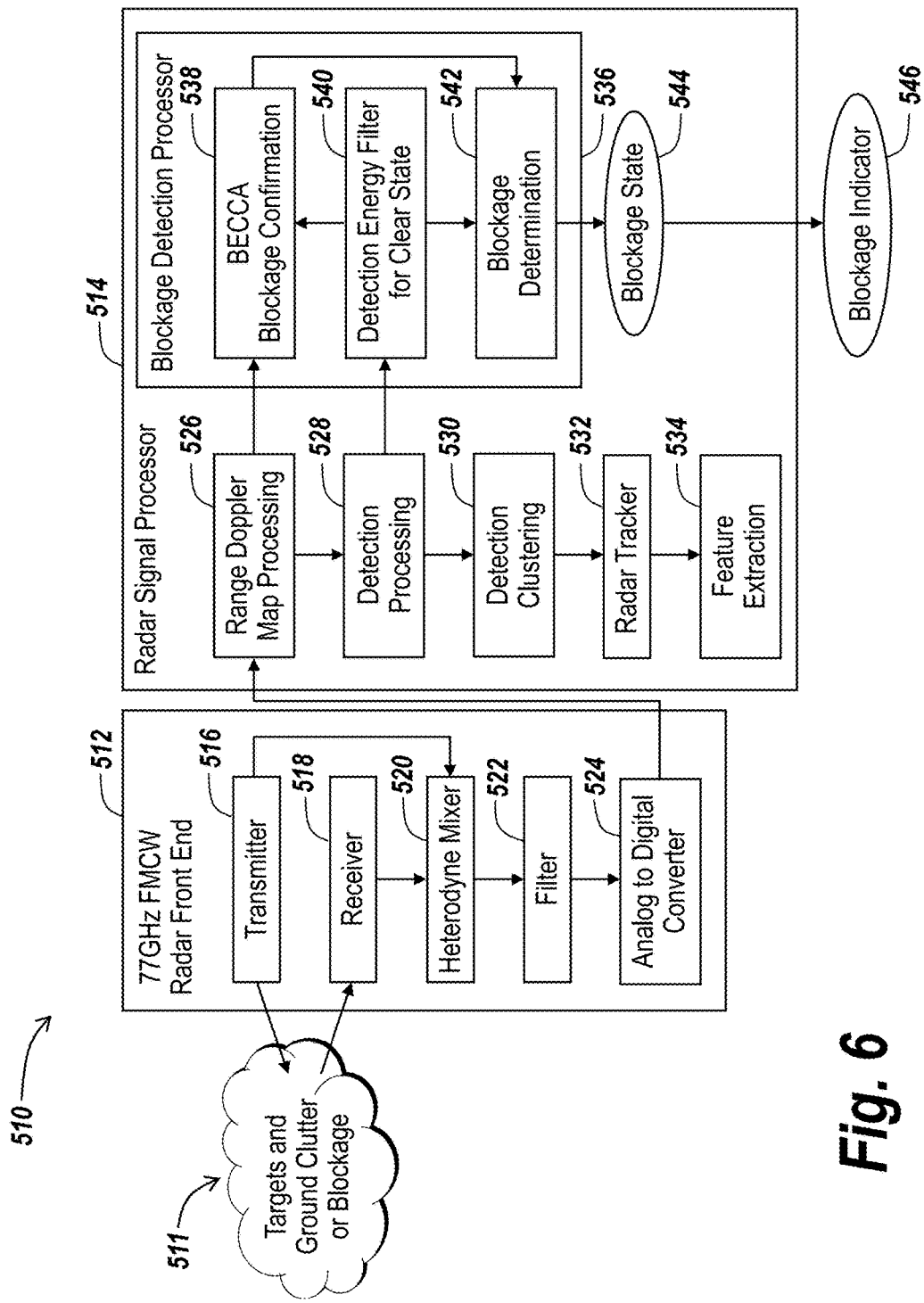
FIG. 6 includes a schematic functional block diagram of a automotive radar system with detection of sensor blockage, in accordance with some exemplary embodiments.

FIG. 6 includes a schematic functional block diagram of a automotive radar system 510 with detection of sensor blockage, according to some exemplary embodiments. Referring to FIG. 6, system 510 includes a radar front end 512 and a radar signal processor (RSP) 514. In some particular exemplary embodiments, radar front end 512 can be a 77 GHz frequency-modulated continuous-wave (FMCW) radar front end. Other types of radar can also be used. Radar front end 512 is characterized by a region 511 in the field of view of radar front end 512. The region effectively can include targets, ground clutter and/or some sensor blockage mechanism such as ice, snow, dirt, debris, etc. A signal is transmitted from transmitter 516, and radar returns from region 511 are received back at receiver 518.

In the exemplary radar system 510, radar front end 512 can be a heterodyne system, which mixes the radar returns with a local oscillator signal in a heterodyne mixer 520 to generate intermediate frequency (IF) signals. The IF signals are filtered in filter 522, and the filtered signals are converted to digital signals in analog-to-digital converter (ADC) 524. The digital signals generated by ADC 524 are forwarded to radar signal processor 514 for further processing in accordance with the exemplary embodiments described herein in detail.

The converted digital received signals are forwarded to range Doppler map processing 526 in RDP 514. Range Doppler Map processing 526 involves a two-dimensional Fast Fourier Transform (FFT) operation performed on the collected time-domain data. The FFT input is collected time-domain data, and it includes N samples by M pulses of ADC data. This data is sent through two FFT's, an N-point FFT over the samples of each pulse resulting in the range dimension, and an M-point FFT over the pulses at each range resulting in the Doppler dimension. The N-by-M range-Doppler map is then sent to detection processing 528. The BECCA uses the magnitude of the range-Doppler data to detect environmental clutter. Detection processing 528 involves comparing the magnitude of each range Doppler cell to that of its neighbors to determine a Signal-to-Noise Ratio (SNR). If the SNR of the range Doppler cell is above the detection threshold of, for example, 13 dB, a raw detection is declared at the appropriate range-Doppler cell. Raw detections are sent to detection clustering processing 530. Detection clustering 530 involves a discarding of redundant detections from being sent to the tracker. For example, neighboring detections passing the detection threshold are removed if they are of lesser magnitude. The clustered detections are used by the signal processor to create tracks and they are also used to calculate a filtered energy value, as described below in detail. The Radar Tracker 532 involves recording and filtering the clustered detections over time to create smoothed trajectories of objects in the field of view. Using the tracks as an input, feature extraction 534 is performed. Feature extraction 534 involves using track data to determine pertinent information related to active safety based on the current track list and host vehicle dynamics.

RSP 514 also includes a blockage detection processor 536, which performs the blockage detection of the exemplary embodiments described herein in detail. BECCA Blockage Confirmation 538 performs as described in detail herein to confirm and report the existence of a blockage of the radar sensor module. As described in detail herein, BECCA Blockage Confirmation 538 uses detection energy in determining whether a blockage is present. To that end, Detection Energy Filter 540 is defined as follows:

$$\text{Filtered\_Energy\_Value} = (\text{sum}(\text{detection\_SNR}) * \text{filter\_coefficient}) + (\text{Previous\_Filtered\_Energy\_Value} * 1 - \text{filter\_coefficient}))$$

Where detection_SNR is the set of Signal Processor clustered detections for the current processing cycle and filter_coefficient is 0.001. In the case that the Filtered Energy Value is greater than the predetermined threshold, the sensor is clear and BECCA is not executed. In the case that the Filtered Energy Value is less than or equal to the predetermined threshold, then BECCA is executed to determine the blockage state. Blockage determination 542 involves determining the blockage state by use of BECCA blockage confirmation as shown in FIG. 4. The inputs are clustered detections and Range Doppler map data, as described above. When blockage detection processor 536 determines that a sensor is blocked, the system enters blockage state 544, and the blockage is indicated by blockage indicator 546.

FIGS. 7A and 7B are graphs of detections generated from radar returns to a radar sensor module in host automobile 5, over time, illustrating the detections over Doppler range bins from zero meters to approximately 1.7 meters. FIG. 7A illustrates the case in which host automobile 5 is initially moving, and stops moving at approximately 14 seconds. FIG. 7B illustrates the case in which host automobile 5 is initially stationary and starts moving at approximately 6 seconds. According to the present disclosure, the radar sensor module providing the detections illustrated in FIGS. 7A and 7B is concluded to be functioning properly and not blocked, since the detection energy in the illustrated near-range, zero-Doppler bins changes when the motion state of host automobile 5 changes.

Specifically, referring to FIG. 7A, with host automobile 5 moving, ground clutter returns, such as returns from the road surface, result in clutter detections that are distributed over the near-range Doppler bins. However, when host automobile 5 undergoes a change in motion state, i.e., stops moving, the detection energy for ground clutter combines in the zero-Doppler bin, as indicated at 602. This is due to the sensor's ability to detect the velocity of the ground clutter drop to zero when host automobile 5 stops moving. Thus, the radar sensor module can be characterized as being unblocked, i.e., clear. Conversely, referring to FIG. 7B, when host automobile 5 is stationary, the detection energy for ground clutter combines in the zero-Doppler bin. However, when host automobile 5 starts moving, the detection energy due to ground clutter detection in the zero-Doppler bin decreases and is spread over a plurality of near-range Doppler bins, as indicted at 604. This is because the sensor can "see" that when host automobile 5 starts moving, the ground clutter exhibits relative motion with respect to host automobile 5. Thus, once again, the radar sensor module can be characterized as being unblocked, i.e., clear.

According to the exemplary embodiments, if the radar sensor module does not see the change in detection energy in the zero-Doppler bin illustrated by 602 and 604 in FIGS. 7A and 7B, then radar sensor module can be characterized as being blocked. This conclusion is based on the sensor's inability to detect a change in ground clutter return when the host automobile 5 changes motion state when blocked. Conversely, when the sensor is not blocked and the host automobile 5 is moving, the ground clutter detections are also moving with respect to host automobile 5, and, when host automobile 5 is stationary, ground clutter detections should increase, indicating that ground clutter is stationary with respect to host automobile 5.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar system in a movable host system, the radar system comprising:
    a radar detector for detecting reflected radar signals and converting the reflected radar signals into digital data signals;
    a motion detector for detecting motion of the host system and generating a signal indicative of velocity of the host system, the signal indicative of velocity of the host system identifying a present motion state of the host system, the present motion state being one of a first host-stationary motion state in which the host system is stationary and a second host-moving motion state in which the host system is moving; and
    a processor for receiving the digital data signals and processing the digital data signals to categorize the digital data signals into one or more target categories, one of the target categories being an environmental clutter category, the processor associating each of a plurality of processed groups of the digital data signals with a respective one of the one or more target categories and a respective associated velocity, the group of digital data associated with the environmental clutter category being associated with a current environmental clutter velocity;
    wherein, when the signal indicative of velocity of the host system indicates that the motion state of the host system has changed between the first host-stationary motion state and the second host-moving motion state, if the velocity associated with the environmental clutter category has not changed from the current environmental clutter velocity, then the processor generates a signal which indicates that the radar detector is at least partially blocked.

2. The radar system of claim 1, wherein the processor performs a Fast Fourier Transform (FFT) on the digital data signals.

3. The radar system of claim 2, wherein the processed groups of digital data are associated with data range bins generated by the FFT.

4. The radar system of claim 3, wherein each data range bin generated by the FFT is associated with a Doppler velocity.

5. The radar system of claim 4, wherein the current environmental clutter velocity is associated with a zero-Doppler-velocity range bin generated by the FFT.

6. The radar system of claim 1, wherein the current environmental clutter velocity associated with the environmental clutter category has a zero value.

7. The radar system of claim 1, wherein the reflected radar signals comprise a radar signal transmitted by the radar system and reflected from a scene.

8. The radar system of claim 1, wherein the radar system is an automotive radar system, the movable host system being an automobile.

9. The radar system of claim 8, wherein the environmental clutter category includes radar collective return from a surface of a road on which the automobile is located, the radar collective return being distributed within the beam of the radar detector.

10. The radar system of claim 8, wherein the reflected radar signals comprise a radar signal transmitted by the radar system and reflected from a scene.

11. The radar system of claim 10, wherein the scene includes a surface of a road on which the automobile is located.

12. A method of processing in a movable radar system, the method comprising:
    detecting reflected radar signals with a radar detector and converting the reflected radar signals into digital data signals, the signal indicative of velocity of the host system identifying a present motion state of the host system, the present motion state being one of a first host-stationary motion state in which the host system is stationary and a second host-moving motion state in which the host system is moving;
    detecting motion of the radar system and generating a signal indicative of velocity of the radar system;
    processing the digital data signals to categorize the digital data signals into one or more target categories, one of the target categories being an environmental clutter category, the processing including associating each of a plurality of processed groups of the digital data signals with a respective one of the one or more target categories and a respective associated velocity, the group of digital data associated with the environmental clutter category being associated with a current environmental clutter velocity; and
    generating a signal which indicates that the radar detector is at least partially blocked when, if the signal indicative of velocity of the radar system indicates that the motion state of the host system has changed between the first host-stationary motion state and the second host-moving motion state, the velocity associated with the environmental clutter category has not changed from the current environmental clutter velocity.

13. The method of claim 12, wherein the processing comprises performing a Fast Fourier Transform (FFT) on the digital data signals.

14. The method of claim 13, wherein the processed groups of digital data are associated with data range bins generated by the FFT.

15. The method of claim 14, wherein each data range bin generated by the FFT is associated with a Doppler velocity.

16. The method of claim 15, wherein the current environmental clutter velocity is associated with a zero-Doppler-velocity range bin generated by the FFT.

17. The method of claim 12, wherein the current environmental clutter velocity associated with the environmental clutter category has a zero value.

18. The method of claim 12, wherein the reflected radar signals comprise a radar signal transmitted by the radar system and reflected from a scene.

19. The method of claim 12, wherein the radar system is an automotive radar system, the movable radar system being disposed in an automobile.

20. The method of claim 19, wherein the environmental clutter category includes radar collective return from a surface of a road on which the automobile is located, the radar collective return being distributed within the beam of the radar detector.

21. The method of claim 19, wherein the reflected radar signals comprise a radar signal transmitted by the radar system and reflected from a scene.

22. The method of claim 21, wherein the scene includes a surface of a road on which the automobile is located.

\* \* \* \* \*